United States Patent
Hara et al.

(10) Patent No.: US 8,520,012 B2
(45) Date of Patent: Aug. 27, 2013

(54) IMAGE PROCESSING METHOD AND APPARATUS FOR SYNCHRONIZED INPUT AND OUTPUT OF DATA AND COMMANDS

(75) Inventors: Yuji Hara, Machida (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 888 days.

(21) Appl. No.: 12/173,956

(22) Filed: Jul. 16, 2008

(65) Prior Publication Data
US 2009/0027404 A1    Jan. 29, 2009

(30) Foreign Application Priority Data
Jul. 26, 2007  (JP) ................................. 2007-194794

(51) Int. Cl.
*G06T 1/20* (2006.01)
*G06F 13/18* (2006.01)

(52) U.S. Cl.
USPC .......................................... 345/506; 345/535

(58) Field of Classification Search
None
See application file for complete search history.

(56) References Cited

U.S. PATENT DOCUMENTS

| | | | |
|---|---|---|---|
| 5,115,241 A | 5/1992 | Ishikawa | 341/143 |
| 5,436,981 A | 7/1995 | Ishikawa | 382/173 |
| 6,084,984 A | 7/2000 | Ishikawa | 382/173 |
| 7,038,964 B2 * | 5/2006 | Mutz et al. | 365/220 |
| 7,425,969 B2 * | 9/2008 | Ogaki | 345/660 |
| 2003/0158608 A1 * | 8/2003 | Ishikawa et al. | 700/2 |
| 2004/0196408 A1 | 10/2004 | Ishikawa et al. | 348/616 |
| 2005/0025374 A1 | 2/2005 | Ishikawa | 382/252 |
| 2006/0228035 A1 | 10/2006 | Ishikawa | 382/252 |
| 2008/0186541 A1 | 8/2008 | Takasaka et al. | 358/1.16 |

FOREIGN PATENT DOCUMENTS

JP    8-214267    8/1996

* cited by examiner

*Primary Examiner* — Joni Richer
*Assistant Examiner* — Michelle Chin
(74) *Attorney, Agent, or Firm* — Fitzpatrick, Cella, Harper & Scinto

(57) ABSTRACT

An image processing apparatus comprises a plurality of processing blocks connected in series, and each respective processing block comprises a processor. In each respective processing block, the processor employs data input into that processing block to perform an image process upon the data. Also, each processing block performs a process upon the processor in response to a command input into the processing block. Each processing block causes an output corresponding to the command that is input after the data to wait until an output of the processor that employed the data input into the processing block prior to the command to perform the process is finished, such that the output of the processor that employed the data to perform the image processing and the output that corresponds to the command is outputted from the processing block in an order whereby the data and the command are input.

12 Claims, 11 Drawing Sheets

IMAGE PROCESSING METHOD AND APPARATUS FOR SYNCHRONIZED INPUT AND OUTPUT OF DATA AND COMMANDS

BACKGROUND OF THE INVENTION

1. Field of the Invention

The present invention relates to an image processing method and an apparatus thereof.

2. Description of the Related Art

An image processing apparatus is known wherein is separately installed a data bus for performing a data input/output, and a CPU bus for performing a setting of a register. With respect to the image processing apparatus of the present type, a control protocol that employs an interrupt signal is used in, for example, changing a parameter of a specific data unit, such as a page, a block, or a band, that is used in a process, or performing a read operation of a register that denotes an interior status. A transmission of the data is suspended while an interrupt process such as the preceding is executed.

When employing the control protocol that employs the interrupt signal, however, it is difficult to change a filter constant or a parameter such as a binarization threshold value that is employed in an image process, or to perform the read operation of the register that denotes the interior status, during a transmission of an arbitrary data interval. In addition, even if such an operation as the preceding were possible, it would be necessary to suspend the transmission of the data while the interrupt is processed, resulting in a slowdown in the processing.

SUMMARY OF THE INVENTION

The present invention was devised with the problems described herein in mind, and has as an objective to provide a data processing method and an apparatus thereof that is capable of executing a process that corresponds to a command in an arbitrary data interval, during a processing of an image.

Another objective of the present invention is to provide an image processing method that is executed upon an image processing apparatus, whereto is connected a plurality of processing blocks, each of which respectively comprises a processing unit, and whereupon the image processing method is executed upon each respective processing block of the plurality of processing blocks, wherein the image processing method performs an image process that employs a data that is input into the processing block, upon the processing unit of the processing block, performs a process that corresponds to a command that is input into the processing block, and causes an output of the command that is input after the data to wait until an output of the processing unit that employed the data that is input into the processing block prior to the command to perform the process is finished, such that the output of the processing unit that employed the data to perform the image processing and the output that corresponds to the command is output from the processing block in an order whereby the data and the command are input into the processing block.

Another objective of the present invention is to provide an image processing apparatus, whereto is connected a plurality of processing blocks, the image processing apparatus comprises a first processing unit, which performs, upon each respective processing block of the plurality of processing blocks, an image process that employs a data that is input into the processing block, a second processing unit that performs a process for the first processing unit that corresponds to a command that is input into the processing block, and a control unit that causes an output that corresponds to the command that is input after the data to wait until an output of the first processing unit that employed the data that is inputted into the processing block prior to the command to perform the process is finished, such that the output of the processing unit that employed the data to perform the image processing and the output that corresponds to the command is output from the processing block in an order whereby the data and the command are inputted into the processing block.

Further features of the present invention will become apparent from the following description of exemplary embodiments, with reference to the attached drawings.

DESCRIPTION OF THE EMBODIMENTS

Exemplary embodiments of the present invention will now be described in detail, with reference to the accompanying drawings.

Figure 1:
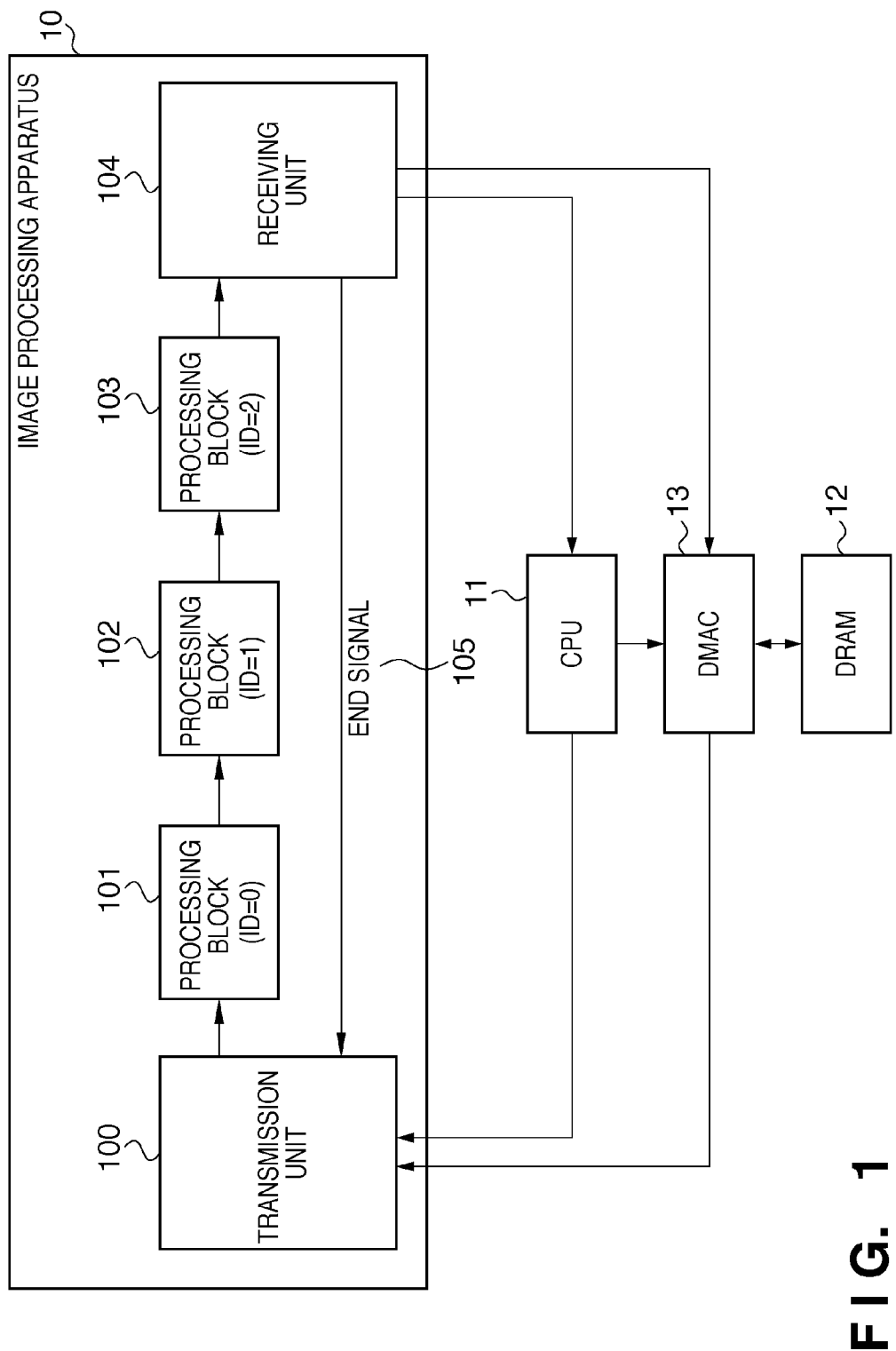
FIG. 1 is a block diagram that depicts a configuration of an image processing apparatus according to an embodiment.

FIG. 1 is a block diagram that depicts a configuration of an image processing apparatus 10 according to an embodiment. Reference numeral 100 is a transmission unit, which multiplexes and transmits a command word and a data word. Reference numerals 101 to 103 are image processing blocks, which are connected in series as depicted in the drawing, and which respectively perform a prescribed image process; hereinafter to be designated "processing block 101 to 103." Reference numeral 104 is a receiving unit, which receives the command word and the data word, and transmits an end signal 105 to the transmission unit 100. Reference numeral 11 is a CPU, which uses the image processing apparatus 10, and, as an instance, controls an apparatus, such as a printing apparatus, that is combined with the image processing apparatus 10. Reference numeral 12 is a DRAM, which stores an image data whereupon a process is to be performed. Reference numeral 13 is a DMAC, which controls a direct transmission of the image data from the DRAM 12 to the image processing apparatus 10.

Following is a description of the command word and the data word, with reference to FIG. 2 through FIG. 5. It is to be understood that the command word and the data word comprise a prescribed bit length, which is presumed to be configured of 64 bits according to the embodiment. Hereinafter, the command word will be referred to as "command," and the data word will be referred to as "data."

Figure 2:
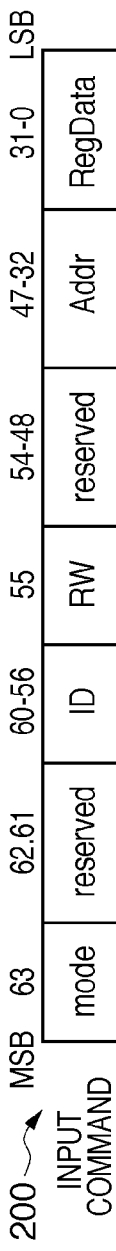
FIG. 2 depicts an input command format according to the embodiment.

FIG. 2 depicts an instance of an input command format. An input command format 200 is presumed to have a most significant bit (MSB) at a 63rd bit thereof, and a least significant bit (LSB) at a zeroth bit thereof. The 63rd bit is a mode flag, that is, a property data, 201, which is for distinguishing between a command mode and a data mode, wherein a value of zero for the mode flag 201 denotes a mode of "DATA," while a value of one for the mode flag 201 denotes a mode of "COMMAND." A 56th bit through a 60th bit is a processing block ID 202, which denotes a number of the processing block whereto the input command is applied. It is to be understood that the processing block ID is allocated as an identification data to each respective processing block, in order to identify any given processing block, and the command is executed only upon the processing block that matches the processing block ID 202, such as will be described hereinafter. A 55th bit is a read-write flag 203, which is for specifying a read-write operation of a register. A 32nd bit through a 47th bit is a register address 204. A zeroth bit through a 31st bit is a data region for a register data 205. In the present circumstance, a value of the register data 205 is zero when a read command is present, that is, when the read-write flag 203 is zero, and is a value of the register that is being written to when a write command is present, that is, when the read-write flag 203 is one. A 48th bit through a 54th bit, and a 61st bit and a 62nd bit, is a reserved region 206, which is not available to be used. The command instructs either the writing of the data to the register that is accessed, or the reading of the data from the register that is accessed, such as per the foregoing description.

Figure 3:
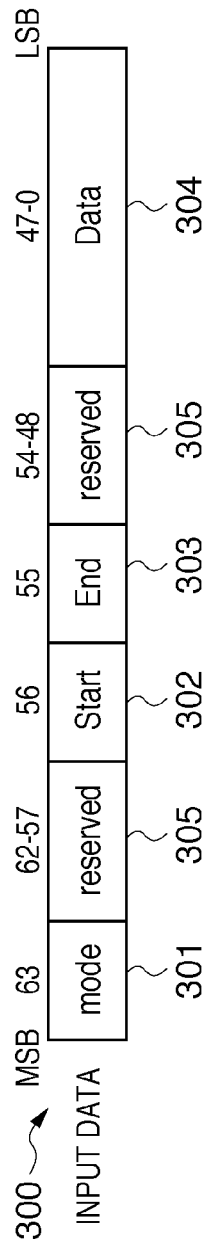
FIG. 3 depicts an input data format according to the embodiment.

FIG. 3 depicts an instance of an input data format. A format of an input data 300 is presumed to have a most significant bit (MSB) at a 63rd bit thereof, and a least significant bit (LSB) at a zeroth bit thereof. The 63rd bit is a mode flag, that is, a property data, 301, which is for distinguishing between a command mode and a data mode, wherein a value of zero for the mode flag 301 denotes a mode of "DATA," while a value of one for the mode flag 301 denotes a mode of "COMMAND." A 56th bit is a start flag 302, which denotes an initial data that is image processed in a prescribed data unit, that is, as a unit of data of a prescribed range, such as a page, a block, or a band. A 55th bit is an end flag 303, which denotes a final data that is image processed. The zeroth bit through a 47th bit denotes a data to be image processed 304. A 48th bit through a 54th bit, and a 57th bit through a 62nd bit, is a reserved region 305, which is not available to be used.

Figure 4:
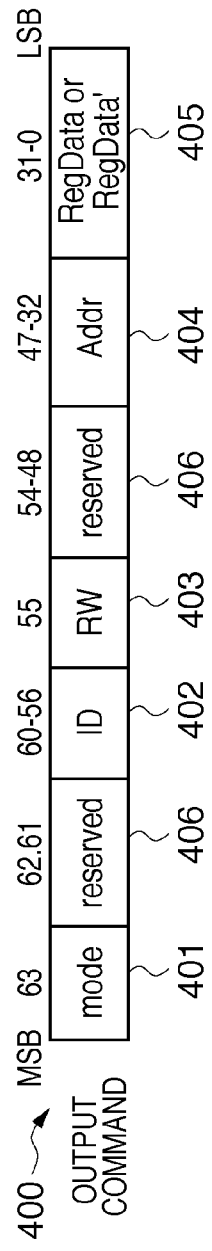
FIG. 4 depicts an output command format according to the embodiment.

FIG. 4 depicts an instance of an output command format. An output command format 400 is presumed to have a most significant bit (MSB) at a 63rd bit thereof, and a least significant bit (LSB) at a zeroth bit thereof. The 63rd bit is a mode flag, that is, a property data, 401, which is for distinguishing between a command mode and a data mode, wherein a value of zero for the mode flag 401 denotes a mode of "DATA," while a value of one for the mode flag 401 denotes a mode of "COMMAND." A 56th bit through a 60th bit is a processing block ID 402, which denotes a number of the processing block whereto the input command is applied. It is to be understood that the processing block ID is allocated as an identification data to each respective processing block, in order to identify any given processing block, and the command is executed only upon the processing block that matches the processing block ID 402, such as will be described hereinafter. A 55th bit is a read-write flag 403, which is for specifying a read-write of a register. A 32nd bit through a 47th bit is a register address 404. A zeroth bit through a 31st bit is a data region for a register data 405. In the present circumstance, a value of the register data 405 is zero when a read command is present, that is, when the read-write flag 403 is zero, and is the value of the register data 205 of the input command format 200 when a write command is present, that is, when the read-write flag 403 is one. A 48th bit through a 54th bit, and a 61st bit and a 62nd bit, is a reserved region 406, which is not available to be used.

Figure 5:
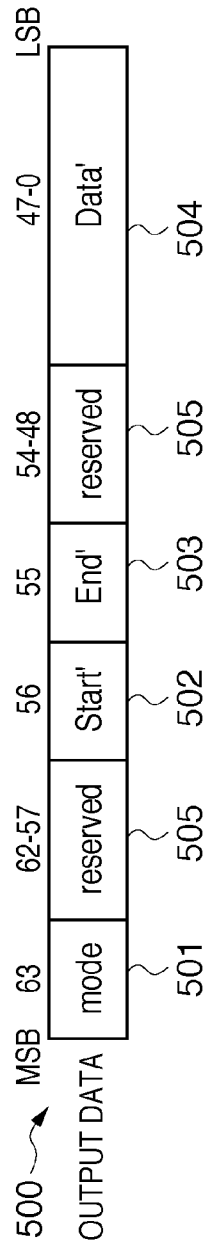
FIG. 5 depicts an output data format according to the embodiment.

FIG. 5 depicts an instance of an output data format. An output data format 500 is presumed to have a most significant bit (MSB) at a 63rd bit thereof, and a least significant bit (LSB) at a zeroth bit thereof. The 63rd bit is a mode flag, that is, a property data, 501, which is for distinguishing between a command mode and a data mode, wherein a value of zero for the mode flag 501 denotes a mode of "DATA," while a value of one for the mode flag 501 denotes a mode of "COMMAND." A 56th bit is a start flag 502, which denotes an initial data that is image processed in a prescribed data unit, that is, as a unit of data of a prescribed range, such as a page, a block, or a band. A 55th bit is an end flag 503, which denotes a final data that is image processed. The zeroth bit through a 47th bit denotes a data to be image processed 504. A 48th bit through a 54th bit, and a 57th bit through a 62nd bit, is a reserved region 505, which is not available to be used.

It is to be understood that the processing block 101 to 103 transforms the input command or the input data into the output command or the output data. The input command and the input data comprise the input command format 200 and the input data format 300, respectively. In addition, the output command and the output data comprise the output command format 400 and the output data format 500, respectively. Under a normal circumstance, the processing block does not change the mode flag, and thus, the value of the mode flag 201 is equivalent to the value of the mode flag 401, and the value of the mode flag 301 is equivalent to the value of the mode flag 501. In a similar manner, the processing block ID 202 is equivalent to the processing block ID 402, the read-write flag 203 is equivalent to the read-write flag 403, and the register address 204 is equivalent to the register address 404.

Figure 6:
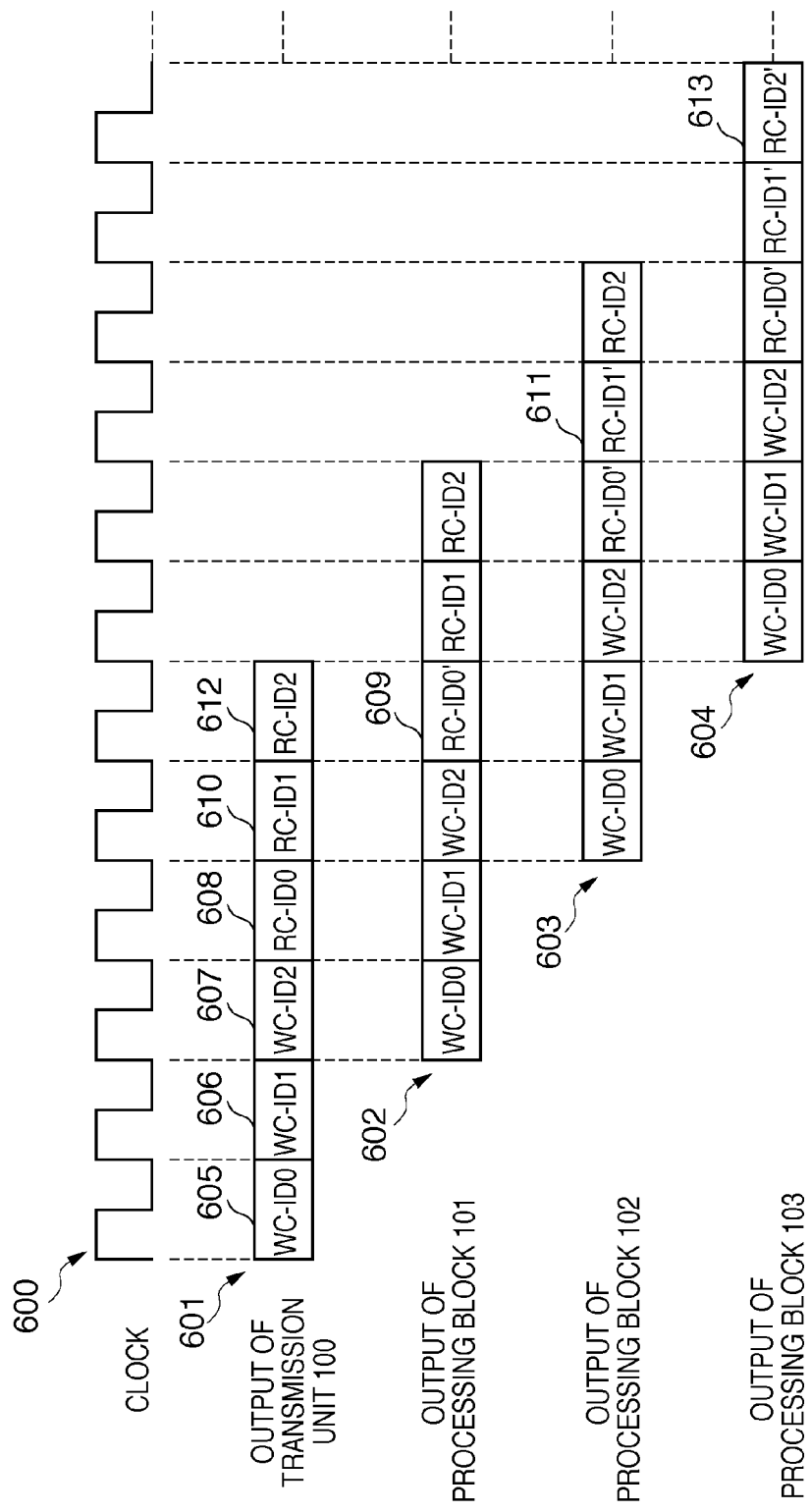
FIG. 6 depicts a timing of a register read-write operation according to the embodiment.

Following is a description of a read-write operation of a register of the image processing apparatus 10, with reference to a timing diagram that is depicted in FIG. 6. In FIG. 6, reference numeral 600 denotes a clock, reference numeral 601 denotes an output of the transmission unit 100, and reference numerals 602 to 604 denote an output of the processing block 101 to 103, respectively. In the present circumstance, a latency of two clock cycles is presumed for the command of each respective processing block. It is also presumed that a value from 0 to 2 is assigned as the processing block ID to each of the processing block 101 to 103, respectively.

First, the CPU 11 sets the register address, a write data, and the processing block ID, to the transmission unit 100. The transmission unit 100 generates either a read register command or a write register command (hereinafter "input command"), according to the input command format 200 that is depicted in FIG. 2. Reference numerals 605, 606, and 607 in FIG. 6 are a write register command for the processing block 101, 102, and 103, respectively, wherein the processing block ID 202 thereof is set respectively to "0," "1," and "2." Reference numerals 608, 610, and 612 in FIG. 6 are a read register command for the processing block 101, 102, and 103, respectively, wherein the processing block ID 202 thereof is set respectively to "0," "1," and "2."

The respective register values are written to the processing block 101 to 103, respectively, according to the write register command 605 to 607. Thereafter, the processing block 101 to 103 generates an output command that is equivalent to the input command from the write register command 605 to 607, according to the output command format 400 that is described in FIG. 4, and outputs the output command thus generated to a subsequent processing block. The receiving unit 104 receives the output command from each respective processing block. Thereafter, the CPU 11 performs a verification of the write register command that is received by the receiving unit 104, verifying that the register write has been performed correctly.

In addition, after performing the register read operation according to the read register command 608, the processing block 101 generates an output command 609 according to the output command format 400 that is described in FIG. 4, and outputs the output command thus generated to the subsequent processing block 102. The output command 609 sets a register data that is read from an address that the read register command 608 specifies in the register data region of the read register command 608. The processing block 102 and the processing block 103 subsequently output the output command 609 as is. The output command 609 is thus received by the receiving unit 104.

The processing block 101 outputs the read register command 610 as is to the subsequent processing block 102. After performing the register read operation according to the read register command 610, the processing block 102 generates an output command 611 according to the output command format 400 that is described in FIG. 4, and outputs the output command thus generated to the subsequent processing block 103. The output command 611 sets a register data that is read from an address that the read register command 610 specifies in the register data region of the read register command 610. The processing block 103 subsequently outputs the output command 611 as is, whereupon the output command 611 is received by the receiving unit 104.

Furthermore, the processing block 101 and the processing block 102 output the read register command 612 as is to the subsequent processing block 103. After performing the register read operation according to the read register command 612, the processing block 103 generates an output command 613 according to the output command format 400 that is described in FIG. 4, and subsequently outputs the output command thus generated. The output command 613 sets a register data that is read from an address that the read register command 612 specifies in the register data region of the read register command 612. The output command 613 thus output is received by the receiving unit 104.

Thereafter, the CPU 11 acquires the register value from the read register command that is received by the receiving unit 104. As per the preceding description, when the plurality of processing blocks are connected in series, the output of the preceding processing block is outputted to the subsequent processing block as a multiplexed data, and an ultimate processing result is received by the receiving unit 104.

Figure 7:
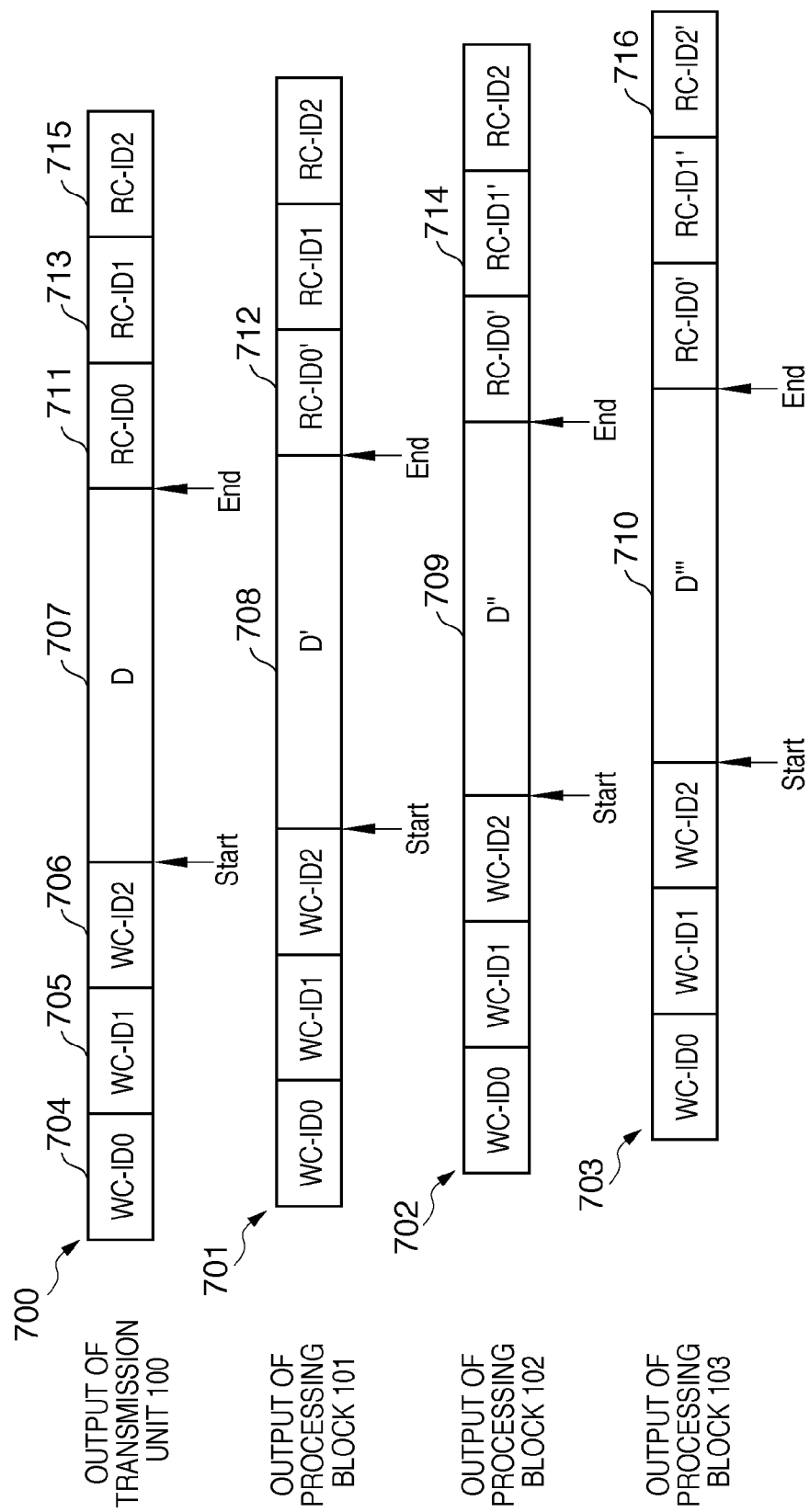
FIG. 7 depicts a timing of a first image processing operation according to the embodiment.

Following is a description of an image processing operation when neither the register read or register write operation is performed during the image processing by the image processing apparatus 10 in the prescribed data unit, that is, as the unit of data of the prescribed range, such as the page, the block, or the band, with reference to a timing diagram that is depicted in FIG. 7. In FIG. 7, reference numeral 700 denotes an output of the transmission unit 100, and reference numerals 701 to 703 denote an output of the processing block 101 to 103, respectively. In the present circumstance, a latency of two clock cycles is presumed for the command of each respective processing block, in a manner similar to the description of FIG. 6, given that a command is not being transmitted during the image processing, that is, an interval from a time when a data whereupon is set the start flag 302 that denotes the initial data is transmitted to a time when a data whereupon is set the end flag 303 that denotes the final data is transmitted. In addition, a latency of four clock cycles is presumed for the data of each respective processing block.

First, the CPU 11 sets the register address, the write data, and the processing block ID, to the transmission unit 100. Reference numerals 704 to 706 are either a singular or plurality of a write register command for the processing block 101 to 103, respectively. Using a sequence similar to the sequence that is described with reference to FIG. 6, the processing block 101 to 103 performs the register write operation according to the write register command 704 to 706, and a setting of an image processing parameter within the processing block is performed thereby.

Next, the image data is transferred to the transmission unit 100 in the specified data unit from a storage medium such as the DRAM 12, via the DMAC 13. In the transmission unit 100, a data 707 is created according to the input data format 300 that is depicted in FIG. 3, and outputted to the processing block 101. After carrying out the image process upon the data 707 thus input, the processing block 101 outputs a data 708 that is obtained thereby to the processing block 102. In a similar manner, after carrying out the image process upon the data 708 thus input, the processing block 102 outputs a data 709 that is obtained thereby to the processing block 103. Furthermore, after carrying out the image process upon the data 709 thus input, the processing block 103 outputs a data 710 that is obtained thereby to the receiving unit 104. The receiving unit 104 transfers the post image processed data to the DRAM 12, via the DMAC 13.

In addition, reference numerals 711, 713, and 715 are either a singular or plurality of a read register command for the processing block 101 to 103, respectively, in order to observe a post image processing interior status thereof. Using a sequence similar to the sequence that is described with reference to FIG. 6, the processing block 101 to 103 performs the register read operation according to the read register command 711, 713, and 715. A result of the register read for the processing block 101 to 103 is sent to the receiving unit 104 as a read register command 712, 714, and 716, and is received by the receiving unit 104.

Thereafter, the CPU 11 acquires the register value from the read register command that is received by the receiving unit 104.

Figure 8:
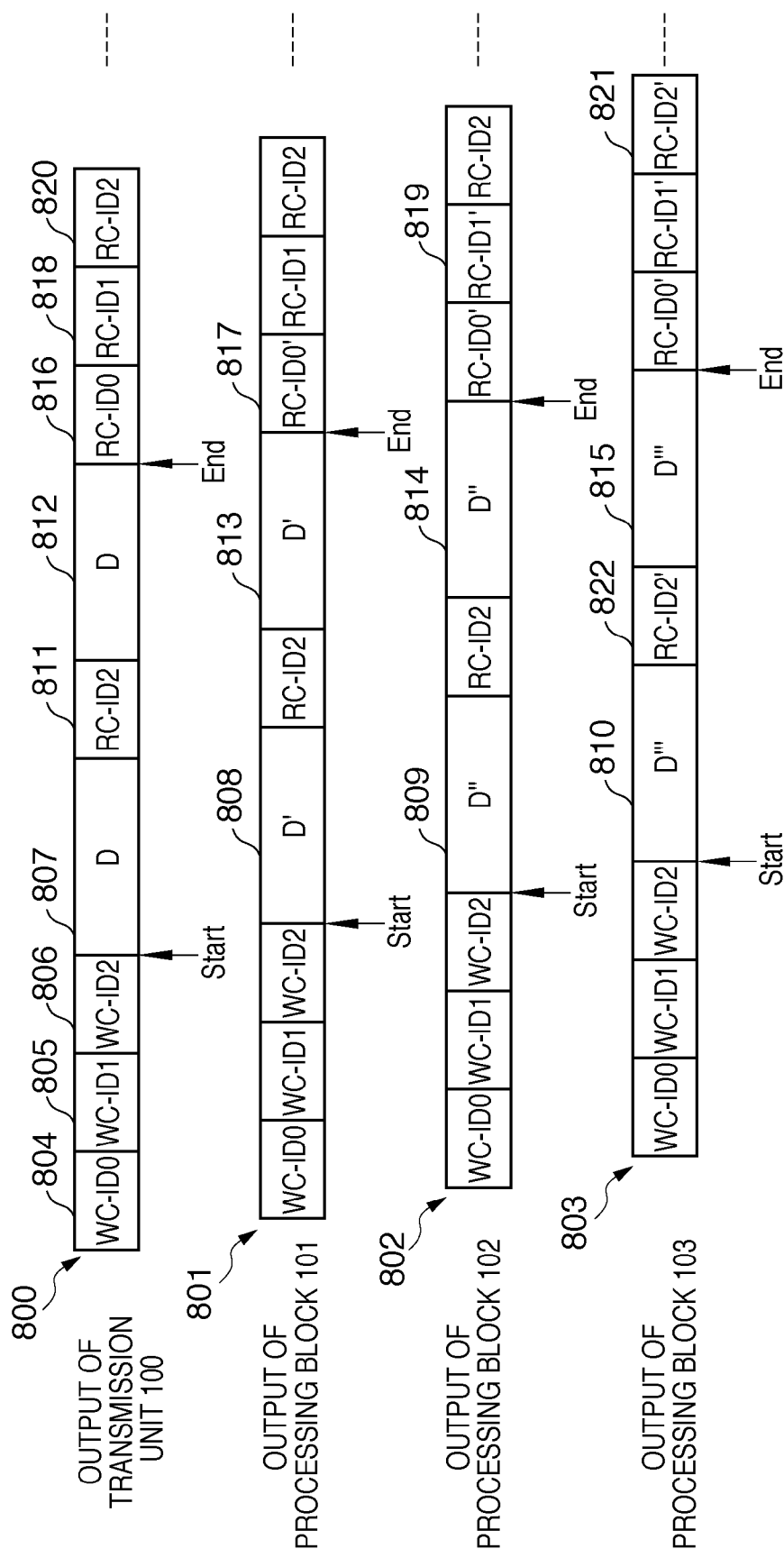
FIG. 8 depicts a timing of a second image processing operation according to the embodiment.

Following is a description of an image processing operation when the register read operation is performed during the image processing by the image processing apparatus 10 in the prescribed data unit, that is, as the unit of data of the prescribed range, such as the page, the block, or the band, with reference to a timing diagram that is depicted in FIG. 8. Reference numeral 800 denotes an output of the transmission unit 100, and reference numerals 801 to 803 denote an output of the processing block 101 to 103, respectively. In the present circumstance, a latency of four clock cycles is presumed for the data of each respective processing block. In addition, a latency will vary for the command of each respective processing block, for a circumstance wherein a command is being transmitted during the image processing, that is, an interval from a time when a data whereupon is set the start flag 302 that denotes the initial data is transmitted to a time when a data whereupon is set the end flag 303 that denotes the final data is transmitted, and for a circumstance wherein a command is being transmitted other than during the image processing. A latency of two clock cycles is presumed for the command that is transmitted other than during the image processing, that is, reference numerals 804 to 806 and 816 to 821, in a manner similar to the description of FIG. 6. Conversely, a latency of four clock cycles is presumed for the command that is transmitted during the image processing, that is, reference numerals 811 and 822, similar to the data to be image processed.

First, the CPU 11 sets the register address, the write data, and the processing block ID, to the transmission unit 100. Reference numerals 804 to 806 are either a singular or plurality of a write register command for the processing block 101 to 103, respectively. Using a sequence similar to the sequence that is described with reference to FIG. 6, the processing block 101 to 103 performs the register write operation according to the write register command 804 to 806, and a setting of an image processing parameter for each respective processing block 101 to 103 is performed thereby.

Next, the image data is transferred to the transmission unit 100 in the specified data unit from a storage medium such as the DRAM 12, via the DMAC 13. In the transmission unit 100, a data is created according to the input data format 300 that is depicted in FIG. 3, and is output as a data 807 and a data 812 to the processing block 101. It is to be understood that the transmission unit 100 interposes a read register command 811 for the processing block 103, between the processing thereby of the data 807 and the data 812, in order to observe an interior status thereof during the image processing thereof, and performs an output thereof to the processing block 101.

The processing block 101 carries out the image process upon the data 807 and the data 812, and outputs a data 808 and a data 813 that is obtained thereby to the processing block 102. In such a circumstance, the read register command 811 is interposed between the data 808 and the data 813, and is output as such to the processing block 102.

In a similar manner, the processing block 102 carries out the image process upon the data 808 and the data 813 thus input, and outputs a data 809 and a data 814 that is obtained thereby to the processing block 103. In addition, the read register command 811 is interposed between the data 809 and the data 814, and is output as such to the processing block 103. The processing block 103 carries out the image process upon the data 809 and the data 814 thus input, and outputs a data 810 and a data 815 that is obtained thereby to the receiving unit 104. In addition, the processing block 103 executes the read register command 811, and outputs an output command 822, which is a result of the register read, to the receiving unit 104.

Thereafter, the receiving unit 104 transfers the post image processed data to the DRAM 12, via the DMAC 13. By acquiring the register value from the read register command 815 that is received by the receiving unit 104, it is possible for the CPU 11 to observe the interior status of the processing block 103 during the image processing thereby.

In addition, reference numerals 816, 818, and 820 are either a singular or plurality of a read register command for the processing block 101 to 103, respectively, in order to observe a post image processing interior status thereof. Using a sequence similar to the sequence that is described with reference to FIG. 6, the processing block 101 to 103 performs the register read operation according to the read register command 816, 818, and 820. A result of the register read for the processing block 101 to 103 is sent to the receiving unit 104 as an output command 817, 819, and 821, and is received by the receiving unit 104. By acquiring the register value from the output command 817, 819, and 821 that is received by the receiving unit 104, it is possible for the CPU 11 to observe the post image processing interior status of the processing block 101 to 103 thereby.

Figure 9:
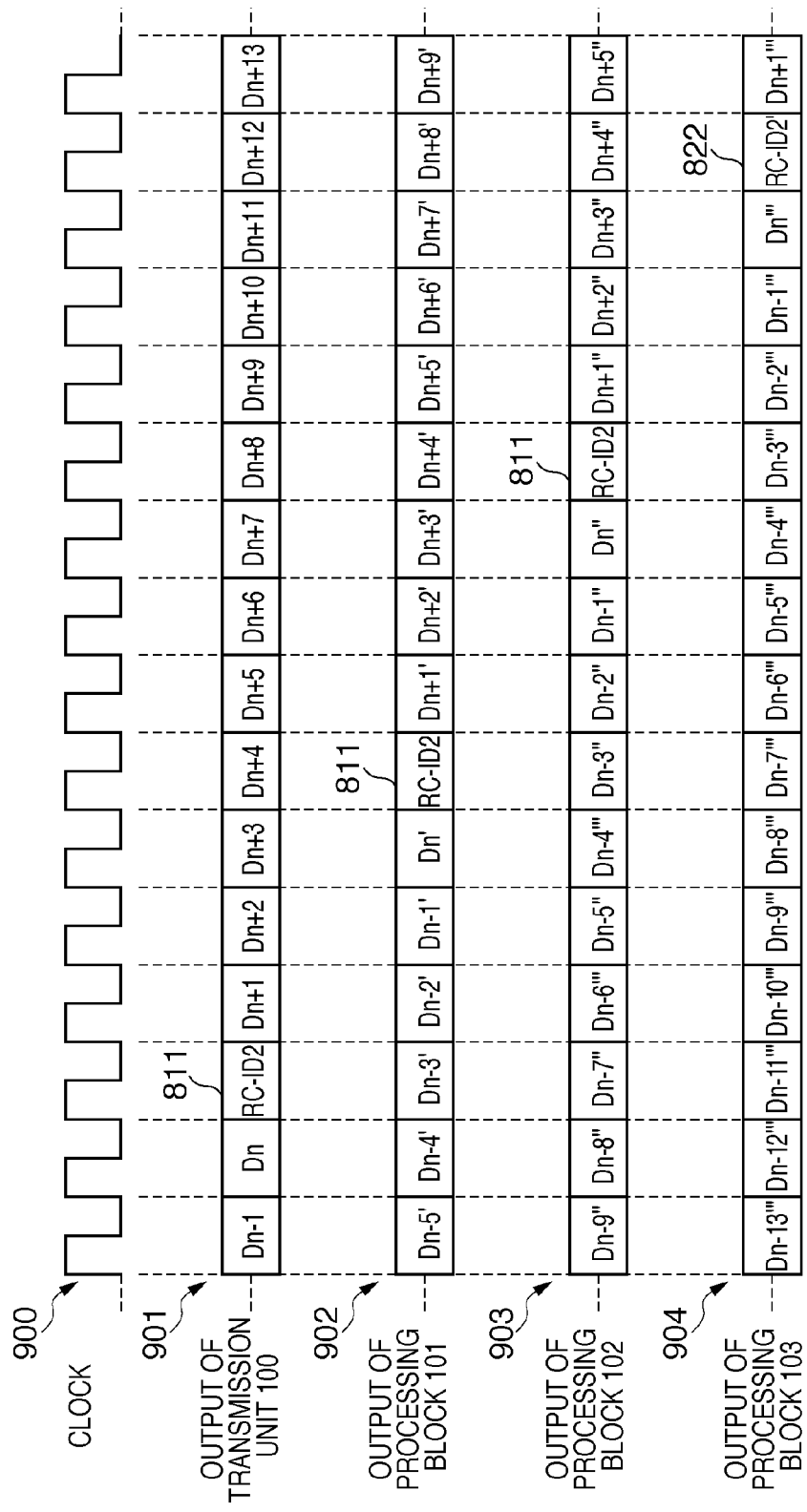
FIG. 9 depicts a detailed timing of the second image processing operation according to the embodiment.

Following is a description of a timing diagram that is depicted in FIG. 9 in greater detail than the timing diagram that is depicted in FIG. 8, referring to a timing of a data transfer before and after the read register command 811. Reference numeral 900 denotes a clock, reference numeral 901 denotes an output of the transmission unit 100, and reference numerals 902 to 904 denote an output of the processing block 101 to 103, respectively. In addition, reference numerals 811 and 822 are the read register command that is depicted in FIG. 8 and the output command that corresponds thereto. The read register command 811 performs the register read on the processing block 103, such as is described with reference to FIG. 8. Normally, the latency for the command of the processing block 103 would be two clock cycles. The read register command 811, however, is intended to read the register value of the interior status of the processing block 103 at a time whereat up to an input data Dn" is processed. As a consequence thereof, the latency of the read register command 811 will be four clock cycles, similar to the data to be image processed. Accordingly, an output thereof, that is, the output command 822, is output in an order . . . Dn'", RC_ID2', Dn+1'", . . . while maintaining a context of a post processing data Dn'" and Dn+1'" therewith.

Figure 10:
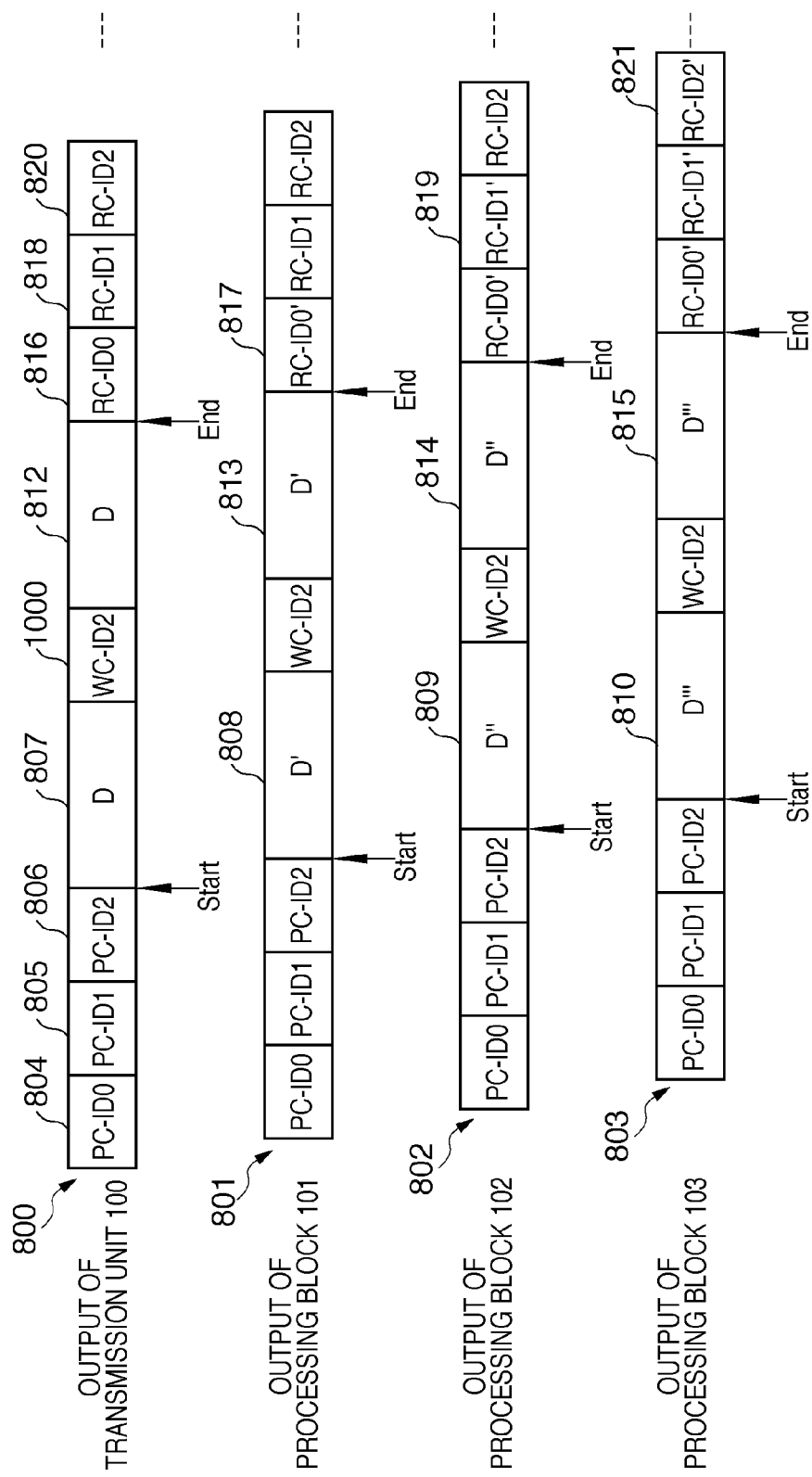
FIG. 10 depicts a timing of a third image processing operation according to the embodiment.

Following is a description of an image processing operation when the register write operation is performed during the image processing by the image processing apparatus 10 in the prescribed data unit, that is, as the unit of data of the prescribed range, such as the page, the block, or the band, with reference to a timing diagram that is depicted in FIG. 10. In the present circumstance, an operation or a timing that is identical to the operation or the timing that is depicted in FIG. 8 will be designated herein with an identical reference numeral, and a description thereof will be omitted herein. In addition, a latency of four clock cycles is presumed for the data of each respective processing block, in a manner similar to the description thereof in FIG. 8.

Furthermore, a latency will vary for the command of each respective processing block, for a circumstance wherein a command is being transmitted during the image processing, that is, an interval from a time when a data whereupon is set the start flag 302 that denotes the initial data is transmitted to a time when a data whereupon is set the end flag 303 that denotes the final data is transmitted, and for a circumstance wherein a command is being transmitted other than during the image processing. Put another way, a latency of two clock cycles is presumed for the command that is transmitted other than during the image processing, that is, reference numerals 804 to 806 and 816 to 821, in a manner similar to the description of FIG. 6. Conversely, a latency of four clock cycles is presumed for a write register command 1000 that is transmitted during the image processing, similar to the data to be image processed.

A difference between FIG. 10 and FIG. 8 is that the write register command 1000 is substituted for the read register command 811 with regard to the processing block 103. An alteration of a register setting value of the processing block 103 is thereby performed during the image processing operation in the prescribed data unit. In addition, the write register command 1000 is sent as is from the processing block 103 to the receiving unit 104, such as is described in FIG. 6.

Figure 11:
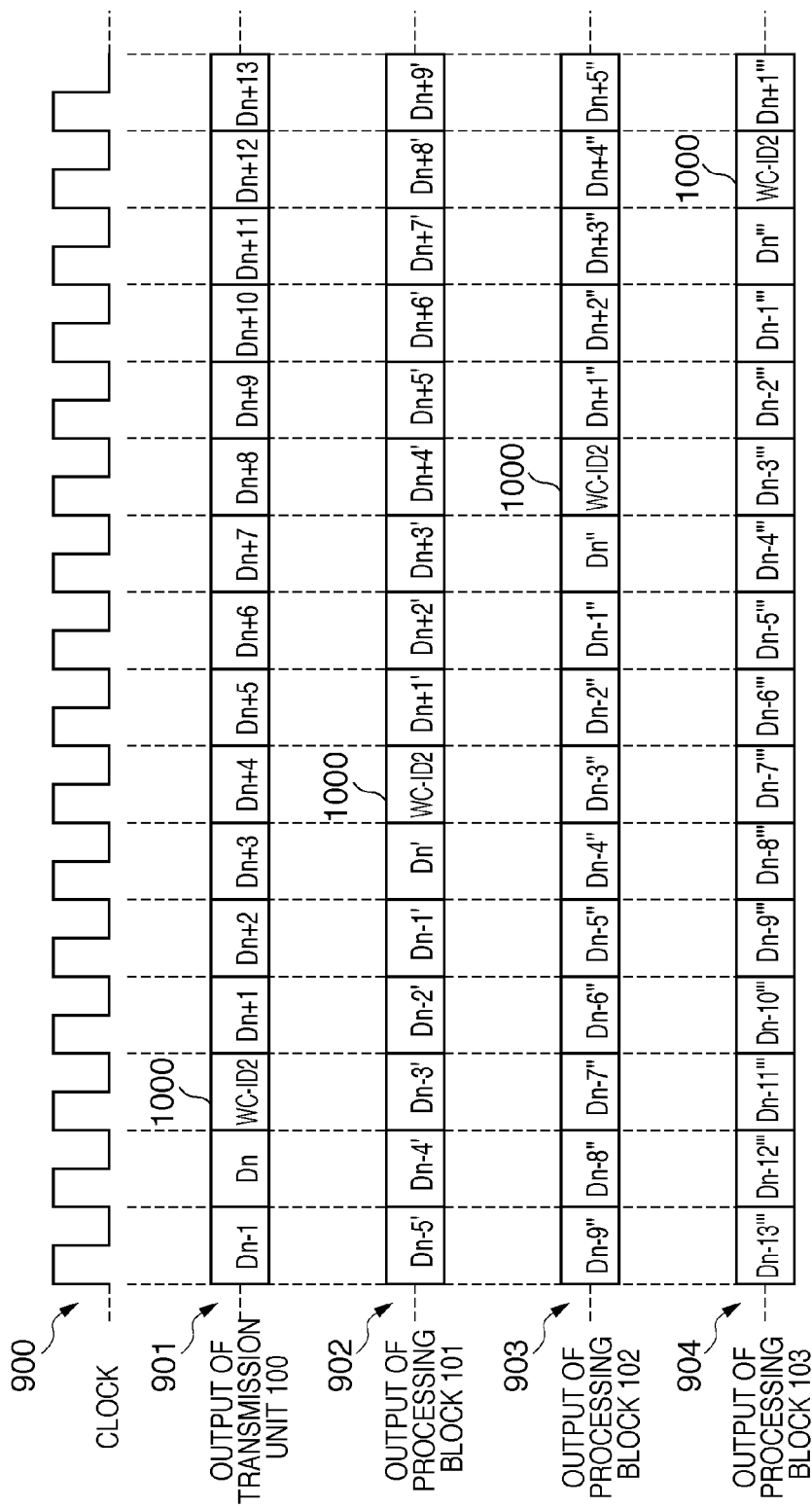
FIG. 11 depicts a detailed timing of the third image processing operation according to the embodiment.

Following is a description of a timing diagram that is depicted in FIG. 11 in greater detail than the timing diagram that is depicted in FIG. 10, referring to a timing of a data transfer before and after the write register command 1000. An operation or a timing in FIG. 11 that is identical to the operation or the timing that is depicted in FIG. 9 will be designated herein with an identical reference numeral, and a description thereof will be omitted herein. A difference between FIG. 11 and FIG. 9 is that the read register command 811 is substituted for the write register command 1000 that is denoted in FIG. 10.

The write register command 1000 causes the processing block 103 to perform the register write, such as is described in FIG. 10. Normally, the latency with respect to the processing block 103 is two clock cycles. The write register command 1000, however, is intended to change the setting of the processing block 103 as relates to the image processing of the input data Dn+1" and subsequent thereto. As a consequence thereof, the latency of the write register command 1000 is set to four clock cycles, identically with the data. An output thereof Accordingly, the output thereof, is outputted in an order . . . Dn''', WC_ID2, Dn+1''', . . . while maintaining a context of a post processing data Dn''' and Dn+1''' therewith. The updating of the register in the processing block 103, however, is performed before the data Dn+1" is processed.

Figure 12:
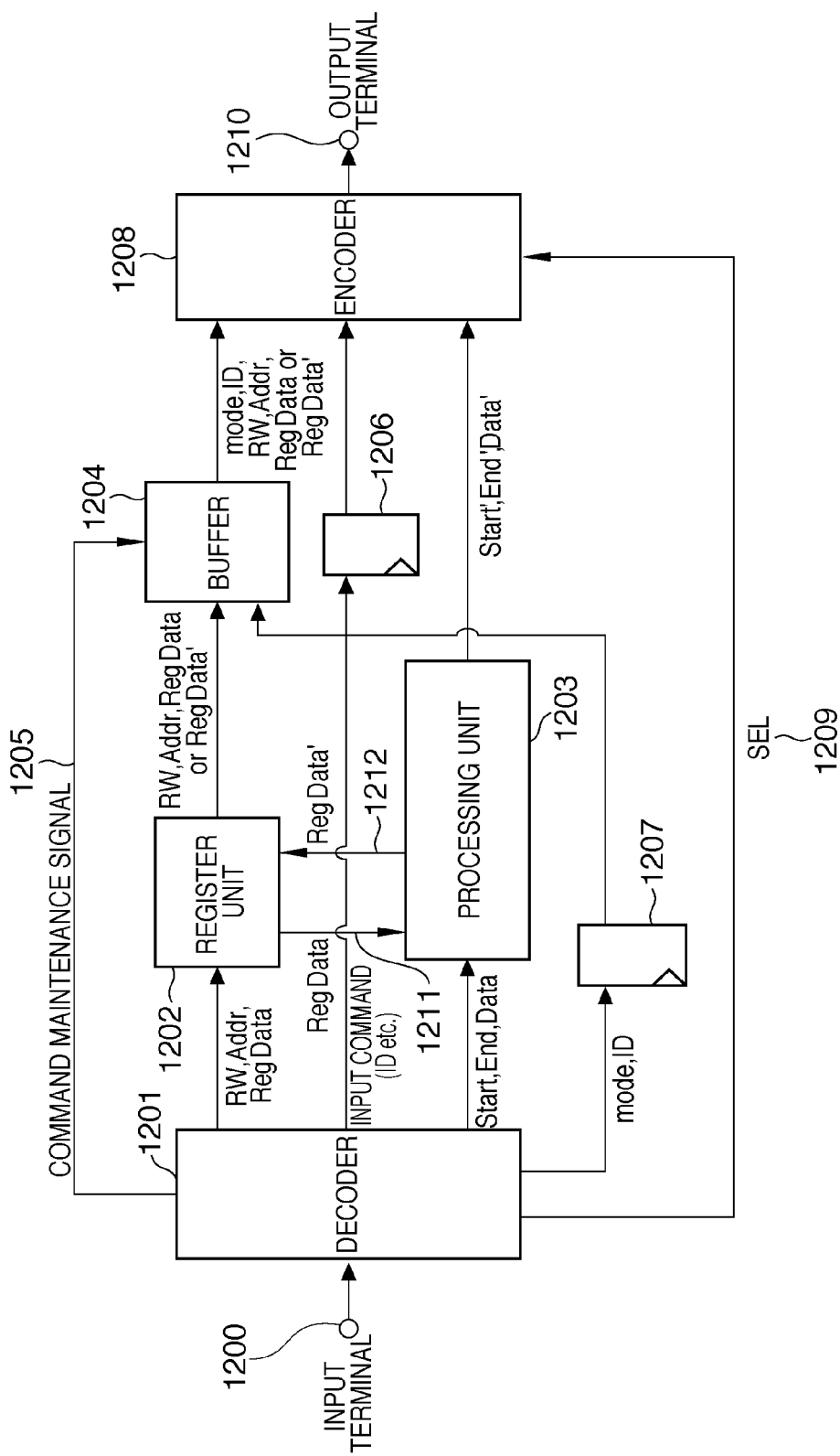
FIG. 12 depicts a configuration of an image processing block according to the embodiment.

Following is a detailed description with respect to the processing block 101 to 103. FIG. 12 is a block diagram that depicts an internal configuration of each respective image processing block 101 to 103. Reference numeral 1200 is a command and data input terminal. Reference numeral 1201 is a decoder, which decodes the command and the data that is input via the input terminal 1200. Reference numeral 1202 is a register unit, which performs a read and a write of the register data according to the command that is issued from the decoder 1201. In the present circumstance, a process parameter is stored by the write operation and issued to a processing unit 1203 by way of a signal 1211. In addition, the read operation either performs a read out of the process parameter thus stored, or receives the interior status of the processing unit 1203 by way of a signal 1212, and performs a read out of a value thereof. Reference numeral 1211 is a signal for communicating the process parameter value to the processing unit 1203, and reference numeral 1212 is a signal for communicating the interior status of the processing unit 1203 to the register 1202.

Reference numeral 1203 is a processing unit, which carries out a predetermined process, that is, an image process, on a data, that is, an image data, that is transmitted thereto from the decoder 1201. The decoder 1201 comprises a splitting function, which allocates the data and the command, which is contained within the data that is being transferred, to the processing unit 1203 and the register unit 1202, in accordance with the mode flag 201, 301, 401, and 501. Reference numeral 1204 is a buffer, which guarantees a context of the command and the data. Reference numeral 1205 is a command maintenance signal, which is output from the decoder 1201 to the buffer 1204. Reference numeral 1206 is a flip-flop, which performs an adjustment to a delay that is interposed into an assembly that would output the input command as is when an ID mismatch occurs with the input command. Reference numeral 1207 is a flip-flop, which performs an adjustment to a delay of the mode flag 201, which is decoded with the decoder 1201, and the processing block ID 202. Reference numeral 1208 is an encoder, which generates the output command and the output data. Reference numeral 1209 is a select signal, which selects the output that the encoder 1208 will output. Reference numeral 1210 is an output terminal, which outputs the command and the data.

In FIG. 12, the decoder 1201 splits the multiplexed command and data. The register unit 1202 stores the value of the image processing parameter, and the processing unit 1203 performs the image processing. The buffer 1204 guarantees a temporal context, and the encoder 1208 selects the output of the buffer 1204, the output of the processing unit 1203, and the output of the decoder 1201.

Figure 13:
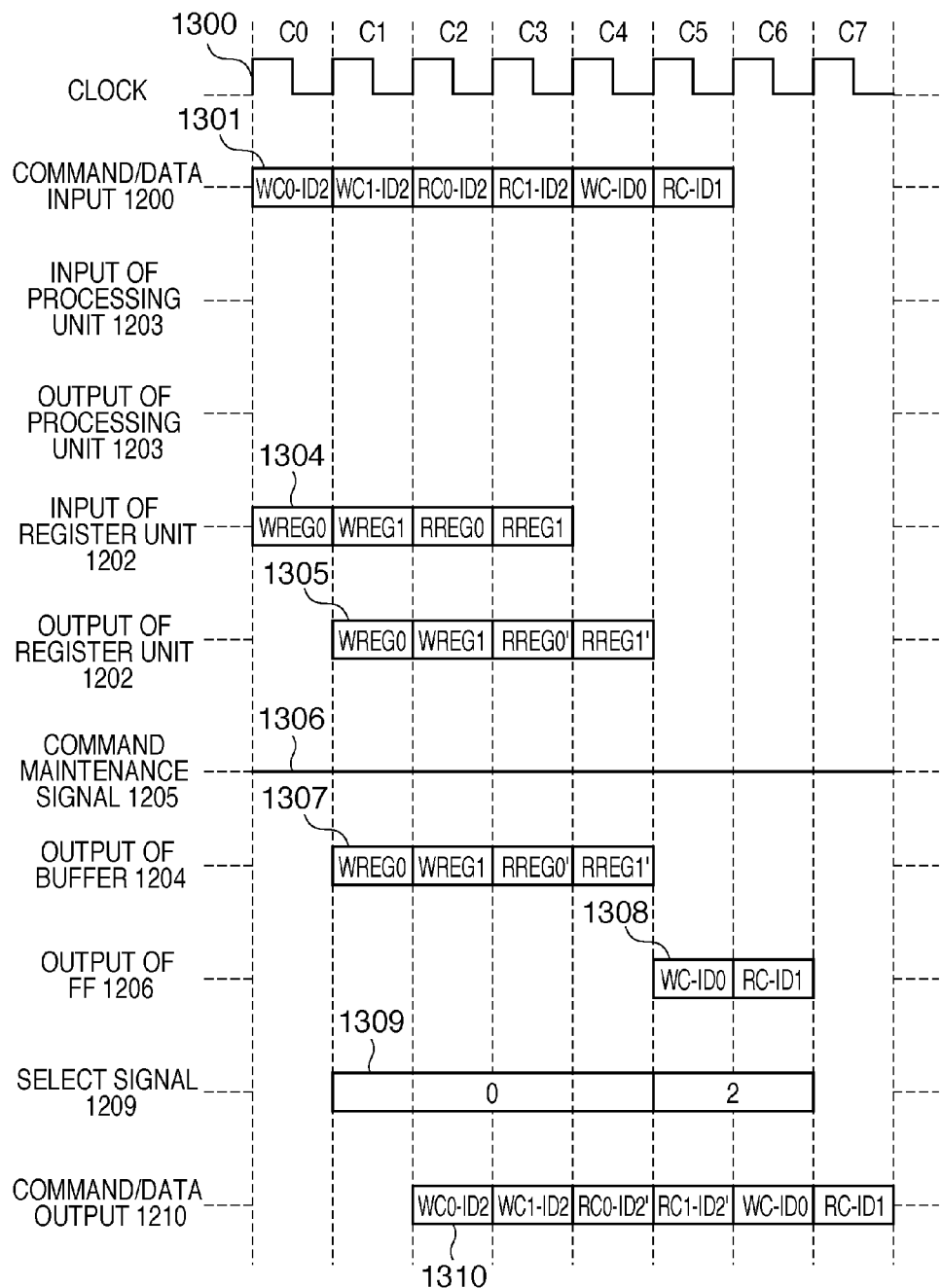
FIG. 13 depicts a timing of a read-write operation of a register of the image processing block according to the embodiment.

Following is a description of the register write and read operation that is performed by the processing block that is depicted in FIG. 12, with reference to FIG. 13. The description in the present circumstance is of an operation wherein the processing block ID that is denoted in FIG. 12 is set to "2," and the operation is not performed during the image processing, that is, an interval from a time when a data whereupon is set the start flag 302 that denotes the initial data is transmitted to a time when a data whereupon is set the end flag 303 that denotes the final data is transmitted, and for a circumstance wherein a command is being transmitted other than during the image processing. Reference numeral 1300 denotes a clock, and reference numeral 1301 denotes a timing of the input data of the command and the data that is inputted into the input terminal 1200. Reference numeral 1304 denotes a timing of the input data that is input into the register unit 1202, and reference numeral 1305 denotes a timing of the output data that is output from the register unit 1202. Reference numeral 1306 denotes a content of the command maintenance signal 1205, reference numeral 1307 denotes a timing of the output data that is output from the buffer 1204, and reference numeral 1308 denotes the output data that is output from the flip-flop 1206.

Reference numeral 1309 denotes a content of the select signal 1209, and reference numeral 1310 denotes a timing of the output data that is output by the encoder 1208, or, put another way, a timing of the output data that is output by the output terminal 1210. It is to be understood that the encoder 1208 selects the output of the buffer 1204 when the select signal 1209 is "0," and selects the output of the flip-flop 1206 when the select signal 1209 is "2," when generating the output command.

As per the depiction in reference numeral 1301, it is presumed that:

In the clock cycle C0, a write register command is input wherein the processing block ID 202=2, and the address 204=0;

In the clock cycle C1, a write register command is input wherein the processing block ID 202=2, and the address 204=1;

In the clock cycle C2, a read command is input wherein the processing block ID 202=2, and the address 204=0;

In the clock cycle C3, a read command is input wherein the processing block ID 202=2, and the address 204=1;

In the clock cycle C4, a write command is input wherein the processing block ID 202=0; and In the clock cycle C5, a read command is input wherein the processing block ID 202=1.

The command that is thereby input is decoded with the decoder 1201. With regard to the command wherein the processing block ID 202 is "2," the content of the read-write flag 203, the address 204, and the register data 205 is output to the register unit 1202. In addition, when the image process is not being carried out, and the processing block ID 202 is other than "2," the command is output as is to the flip-flop 1206. The command thereof is output to the encoder 1208, with the clock cycle thereof being delayed by one clock cycle with the flip-flop 1206. Furthermore, the mode flag 201 and the processing block ID 202 are input into the flip-flop 1207, and the mode flag 401 and the processing block ID 402 are output to the buffer 1204, with the clock cycle thereof being delayed by one clock cycle with the flip-flop 1207. In addition, only the command is input in the clock cycle C0 to C5. Accordingly, the decoder 1201 outputs the select signal 1209 in accordance with the latency for the process block command, that is, two clock cycles, such as is denoted in the select signal content 1309.

In summary, as per the depiction in reference numeral 1304:

In the clock cycle C0, the read-write flag 203=1, that is, write, the address 204=0, and the register data 205 is output to the register unit 1202;

In the clock cycle C1, the read-write flag 203=1, the address 204=1, and the register data 205 is output to the register unit 1202;

In the clock cycle C2, the read-write flag 203=0, that is, read, the address 204=0, and the register data 205 is output to the register unit 1202; and In the clock cycle C3, the read-write flag 203=0, the address 204=1, and the register data 205 is output to the register unit 1202.

In addition, as per the depiction in reference numeral 1308:

The write command when the processing block ID 202=0 is output to the encoder 1208 in the clock cycle C5; and The read command when the processing block ID 202=1 is output to the encoder 1208 in the clock cycle C6.

It is to be understood that the encoder 1208 selects the output of the buffer 1204 when the select signal 1209 is "0," selects the output of the processing unit 1203 when the select signal 1209 is "1," and selects the output of the flip-flop 1206 when the select signal 1209 is "2." It is to be further understood that the select signal is set as follows:

The select signal is "0" for the command that is to be executed with the processing block;

The select signal is "1" for the data that is to be image processed with the processing block; and The select signal is "2" for the command that is not executed with the processing block.

As a consequence thereof, the select signal 1209 has an output of "0" during the clock cycle C1 to C4, and an output of "2" during the clock cycle C5 to C6, as shown by signal contents 1309.

The register unit 1202 performs the register read operation of the desired address when the value of the read-write flag 203 is "0," and at the same time, outputs the read-write flag 403=0, the address 404, and the register data 405 to the buffer 1204. In such a circumstance, the register read operation is performed after the processing of the data that is input immediately prior to the register command. In addition, the register write operation to the register unit 1202 is performed when the value of the read-write flag 203 is "1," and at the same time, outputs the read-write flag 403, the address 404, and the register value of the desired address at the present time to the buffer 1204.

In such a circumstance, the register data thus written is output to the processing unit 1203 as the image processing parameter. In addition, the register read data is made to take into account such as the interior state that is input thereto from the processing unit 1203.

In summary, as per the depiction in reference numeral 1305:

In the clock cycle C1, the write operation to the address 204=0 is performed, and at the same time, the read-write flag 403=1, the address 404=0, and the register data 405 is output to the buffer 1204;

In the clock cycle C2, the write operation to the address 204=1 is performed, and at the same time, the read-write flag 403=1, the address 404=1, and the register data 405 is output to the buffer 1204;

In the clock cycle C3, the read operation to the address 204=0 is performed, and at the same time, the read-write flag 403=0, the address 404=0, and the register data 405 is output to the buffer 1204; and In the clock cycle C4, the read operation to the address 204=1 is performed, and at the same time, the read-write flag 403=0, the address 404=1, and the register data 405 is output to the buffer 1204.

The buffer 1204 maintains the data that is input thereto when the command maintenance signal 1205 is "1." The command maintenance signal 1205 has a value of "1" when the transfer of the command, such as the register read operation, is performed during the image processing in the processing unit 1203, that is, as the unit of data of the prescribed range, such as the page, the block, or the band, or, put another way, during the transfer of the data.

In the instance depicted in FIG. 13, no transfer of the command is being performed during the image processing, and thus, the command maintenance signal 1205 has a value of "0." Thus, the mode flag 401, the processing block ID 402, the read-write flag 403, the address 404, and the register data 405 thus input is output as is to the encoder 1208. Thus, the encoder 1208 performs the generation of the output command that conforms to the output command format 400, in accordance with the select signal 1209, and outputs the output command thus generated by way of the output terminal 1210 one clock cycle later.

In summary, the value of the select signal 1209 is "0" during the clock cycle C1 to C4, and thus, the encoder 1208 selects the output of the buffer 1204. Thus, as per the depiction in reference numeral 1310, the encoder 1208 outputs to the output terminal 1210 as follows:

the write command of the processing block ID 402=2 and the address 404=0 one clock cycle later, in the clock cycle C2;

the write command of the processing block ID 402=2 and the address 404=1 in the clock cycle C3;

the read command of the processing block ID 402=2 and the address 404=0 in the clock cycle C4; and the read command of the processing block ID 402=2 and the address 404=1 one clock cycle later, in the clock cycle C5.

In addition, the value of the select signal 1209 is "2" during the clock cycle C5 and C6, and thus, the encoder 1208 selects the output of the flip-flop 1206. Thus, as per the depiction in reference numeral 1310, the encoder 1208 outputs to the output terminal 1210 as follows:

the write command WC_ID0 of the processing block ID 402=0 one clock cycle later, in the clock cycle C6; and the read command RC_ID1 of the processing block ID 402=1 in the clock cycle C7.

Figure 14:
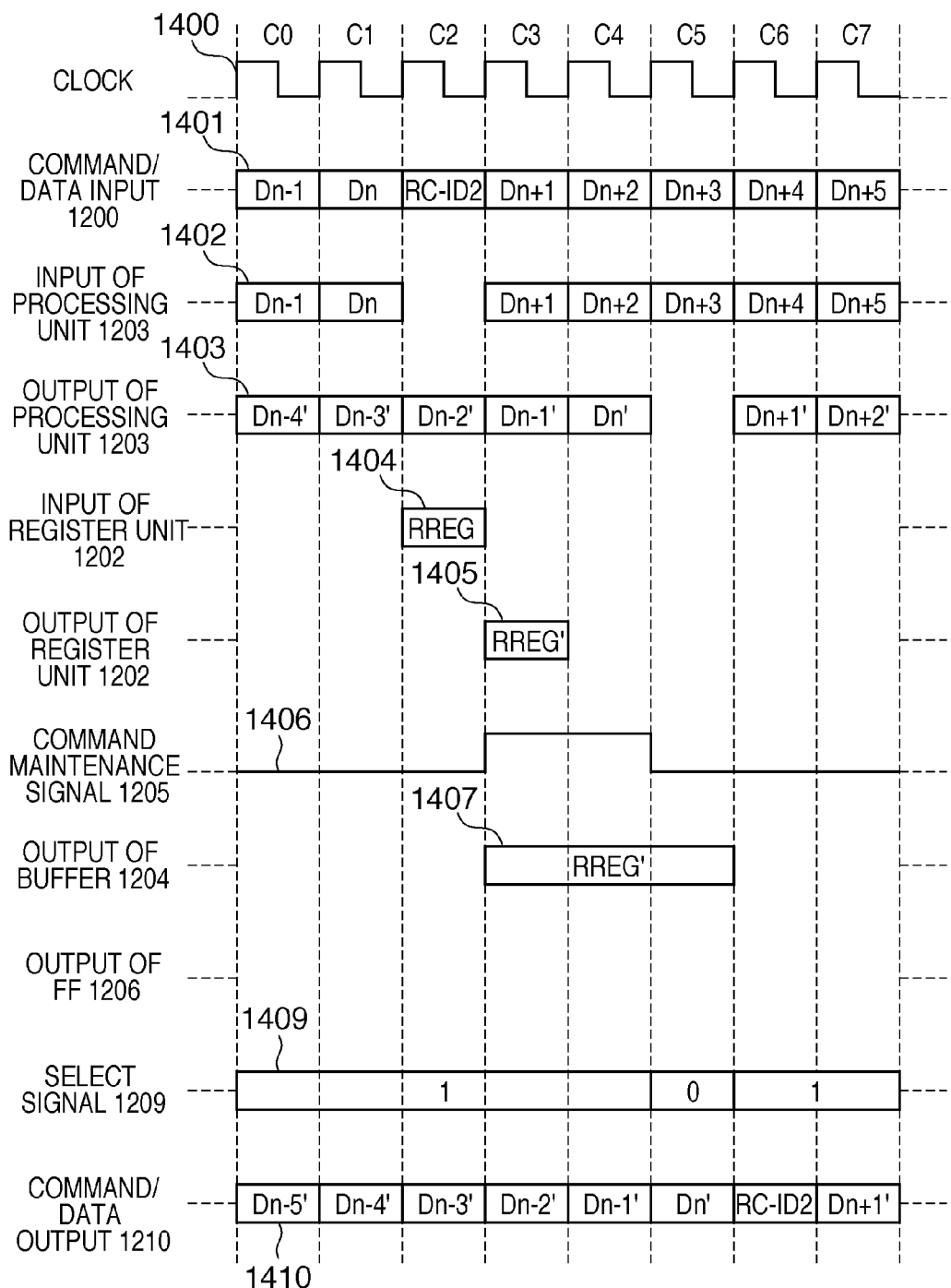
FIG. 14 depicts a timing of an image processing operation of the image processing block according to the embodiment.

Following is a description of the image processing operation wherein the register read is performed during the image processing of the prescribed data unit that by the processing block that is depicted in FIG. 12, that is, the interval from the time when the data whereupon is set the start flag 302 that denotes the initial data is transmitted to the time when the data whereupon is set the end flag 303 that denotes the final data is transmitted, with reference to FIG. 14. It is to be understood that the prescribed data unit is a unit such as the page, the block, or the band. In the present circumstance, the processing block ID that is denoted in FIG. 12 is set to "2," in a manner similar to the processing block ID that is denoted in FIG. 13, and the latency for the data of the process is similarly presumed to be four clock cycles. In addition, the latency of the command of each respective processing block is presumed to be four clock cycles, in a manner similar to the latency of the data, when the command is transmitted during the image processing.

In FIG. 14, reference numeral 1400 denotes a clock, and reference numeral 1401 denotes a timing of the command and the data that is input into the input terminal 1200. Reference numeral 1402 denotes a timing of the input data that is input into the processing unit 1203, and reference numeral 1403 denotes a timing of the output data that is output from the processing unit 1203. Reference numeral 1404 denotes a timing of the input data that is input into the register unit 1202, and reference numeral 1405 denotes a timing of the output data that is outputted from the register unit 1202. Reference numeral 1406 denotes the status of the command maintenance signal 1205, and reference numeral 1409 denotes the status of the select signal 1209. Reference numeral 1407 denotes a timing of an output data of the buffer 1204, and reference numeral 1410 denotes a timing of an output data with respect to the command and the data of the output terminal 1210.

Following is a description of a circumstance wherein the data Dn−1 is input in the clock cycle C0, the data Dn is input in the clock cycle C1, the read command of the processing block ID 202=2 is input in the clock cycle C2, and the data Dn+1 to Dn+5 is input in the clock cycle C3 to C7, as per the depiction in reference numeral 1310. Among the data and the command thus input, at reference numeral 1402, the data is decoded with the decoder 1201, and the start flag 302, the end flag 303, and the data 304 is output to the processing unit 1203. In addition, during the image processing, at reference numeral 1404, the read-write flag 203, the address 204, and register data 205 of the command is output to the register unit 1202, regardless of the value of the processing block ID 202 therein. The reason for doing so is so that the data and the command are propagated to the subsequent processing block while the context of the data and the command is maintained, even if the processing block ID 202 of the command has a value other than "2."

Furthermore, the mode flag 401 and the processing block ID 402 is output to the flip-flop 1207, and output with a one clock cycle delay from the flip-flop 1207 to the buffer 1204. In addition, the data is input to the decoder 1201 in the period other than the clock cycle C2, wherein the read command is input. The decoder 1201 determines that the image processing is taking place while the data is being input, and sets the select signal 1209 to "1." In addition, the decoder 1201 sets the select signal 1209 to "0" when the command that possesses the matching processing block ID is inputted. Note, however, that in reference numeral 1409, the latency of the data of the processing block and the latency for the command that is received during the image processing is four clock cycles, and the select signal 1209 is output in accordance therewith.

In summary, the start flag 302, the end flag 303, and the data 304 is output to the processing unit 1203 in the clock cycle C0, C1 and the clock cycle C3 to C7, such as is depicted in reference numeral 1402. Thus, the address 204 and the register data 205 is output to the register unit 1202 in the clock cycle C2, such as is depicted in reference numeral 1404. In addition, the select signal 1209 is "1" during the clock cycle C0 to C4, C6, and C7, and "0" during the clock cycle C5, such as depicted in reference numeral 1409.

At reference numeral 1403, the processing unit 1203 performs the image processing upon the data thus input with a latency of four clock cycles, and outputs the start flag 502, the end flag 503, and the data 504 of the output data to the encoder 1208.

In addition, the register unit 1202 performs the register read operation that is described in FIG. 13, in response to the register read command RC_ID2 that is input thereto from the input terminal 1200 in the clock cycle C2. In summary, the read operation of the address 204 is performed in the clock cycle C3 at the same time as the read-write flag 403=0, the address 404, and the register data 405 that is read out is output to the buffer 1204, such as is depicted in reference numeral 1405.

The register read command is detected with the decoder 1201 during the image processing of the prescribed unit, such as the page, the block, or the band, such as is described in FIG. 13, and as a consequence thereof, the command maintenance signal 1205 is "1" in the clock cycle C3 and C4. Accordingly, the buffer 1204 outputs the mode flag 401, the processing block ID 402, the read-write flag 403, the address 404, and the register data 405 that is input in the clock cycle C3 as is to the encoder 1208, and the values thereof are maintained in the clock cycle C4 and C5. The condition thereof is depicted with via reference numeral 1407.

The encoder 1208 generates the output command or the output data, which comprises either the output command format 400 or the output data format 500 that is depicted in FIG. 4, in accordance with the select signal 1209 that is denoted in reference numeral 1409, and outputs the output command or the output data thus generated to the output terminal 1210. In summary, the value of the select signal 1209 is "1" in the period of the clock cycle C0 to C4, C6, and C7, and the encoder 1208 selects the output of the processing unit 1203, and outputs the output thus selected in the clock cycle one clock cycle thereafter to the output terminal 1210. In addition, the value of the select signal 1209 is "0" in the period of the clock cycle C5, and the encoder 1208 selects the buffer 1204, and outputs the read output command of the processing block ID 402=2 and the address 404=0 in the clock cycle one clock cycle thereafter to the output terminal 1210.

Whereas the instance that is depicted in FIG. 14 describes a circumstance wherein the register read operation is performed during the image processing, it is to be understood that the operation would be performed in a manner equivalent to the register read operation when performing the register write operation as well. The timing of the register update with the register write operation, however, is performed prior to the commencement of the process for the next data of the register write command.

In addition, whereas the latency adjustment is described herein as fixing the latency of the image processing unit as four clock cycles, the present invention is not restricted thereto. It would be possible, as an instance, even when the latency of the image processing unit is variable, to add a signal to the image processing unit that denotes a location wherein the command is interposed, and to output the command and the data with the order of the command and the data maintained by using the signal that denotes the location wherein the command is interposed to interchange the output thereof.

According to the embodiment, as described herein, the command and the data is multiplexed, transferred over a common data bus, and a result of a process is output from a processing block, while an order of the command and the data that is input thereto is maintained when output therefrom. It is thus possible to perform a control that is synchronized with the data in an arbitrary data interval and at high speed.

Whereas according to the embodiment, an instance is depicted wherein only one command is transferred when performing a register read or a register write operation during an image processing of a data unit, such as a page, a block, or a band, it is to be understood that the present invention is not restricted thereto. It would also be possible to transfer a plurality of commands, as well as to transfer a command by interposing the command in the data at a plurality of locations within the data unit.

In addition, whereas according to the embodiment, an instance is depicted wherein the transfer of the command during the image processing is performed only for a single processing block, it would also be possible to perform the transfer of the command during the image processing for a plurality of processing blocks.

In addition, whereas according to the embodiment, an ID is described that identifies a single processing block within in a single command, it would also be permissible, as an instance, for all processing blocks to be selected in a 1IFH circumstance, that is, when all bits of the processing block ID 202 are set to "1." As an instance thereof, it would be possible to implement a process of writing a command data to a common address within all of the processing blocks with a single command.

In addition, whereas according to the embodiment, a circumstance three processing blocks is described, it would be permissible for the number of processing blocks to be any quantity from one on up. The number of the processing block ID that is capable of being displayed will provide an upper limit thereto, however.

Furthermore, whereas according to the embodiment, a circumstance is described wherein a latency for a command and a data for a data of each respective processing block is identical, the present invention is not restricted thereto. Even when the latency for the command and the data varies for a plurality of processing blocks, it would be possible to respond by changing each respective clock cycle control whereby the decoder 1201 stores the command with the buffer 1204, as appropriate.

Other Embodiments

The embodiment according to the present invention has been described in detail herein. It would be possible, however, for the present invention to assume an embodiment such as a system, an apparatus, a method, a program, or a storage medium, as an instance. Specifically, it would be permissible for the present invention to be applied to a system that is configured from a plurality of devices, as well as to be applied to an apparatus that is formed from a single device.

It is to be understood that the present invention includes a circumstance wherein the function according to the embodiment that is described herein is achieved by a program of a software being supplied, either directly or remotely, to the system or the apparatus, and by a computer of the system or the apparatus loading and executing the program code thus supplied thereto. In such a circumstance, the program thus supplied is a computer program that corresponds to the flowchart that is depicted in the drawings according to the embodiment.

Accordingly, the program code itself, which is installed upon the computer in order to implement the function process according to the present invention implements the present invention. In summary, the present invention also incorporates the computer program itself for implementing the function process according to the present invention.

In the present circumstance, it would be permissible for the program code to take any form, such as an object code, a program that is executed by an interpreter, or a script data that is supplied to an operating system, provided that the form comprises the function of the program.

Following are examples of a computer readable recording medium for supplying the computer program, such as: a floppy disk, a hard drive, an optical disc, a magneto-optical disk, an MO disk, a CD-ROM, a CD-R, a CD-RW, a magnetic tape, a nonvolatile memory card, a ROM, or a DVD, that is, a DVD-ROM or a DVD-R.

As another method of supplying the program, it would be possible to employ a browser on a client computer to connect to a webpage on the Internet, and to download the computer program according to the present invention from the webpage to a recording medium such as a hard drive. In such a circumstance, it would be permissible for the program that is downloaded to be a compressed file that includes an automatic install function. In addition, it would also be possible to implement the supply of the program by segmenting the program code that configures the program according to the present invention into a plurality of files, and downloading each respective file from a different webpage. In summary, a web server wherefrom a plurality of users download the program file for implementing the function process according to the present invention upon the computer is also included within the present invention.

In addition, it would also be possible for the distribution of the program according to the present invention to take a form wherein the program is encrypted, stored upon a storage medium such as a CD-ROM, and distributed to the user thereby. In such a circumstance, a user who fulfills a prescribed condition may also be allowed to download a key information from a webpage on the Internet that decrypts the encryption, use the key information thus downloaded to execute the encrypted program, and install the program upon the computer.

In addition, it would be permissible for the function according to the embodiment to be implemented by an instruction of the program that is loaded into the computer, in a collaboration with the operating system or other software that is running upon the computer, aside from the computer executing the program that is loaded thereupon. In such a circumstance, the function according to the embodiment is implemented by a process that is actually performed, in whole or in part, by the operating system or other software.

Furthermore, it would also be permissible for the function according to the embodiment to be implemented, in whole or in part, by the program that is loaded from the recording medium being written to a memory that is comprised upon a function expansion board that is inserted into the computer, or a function expansion unit that is connected to the computer. In such a circumstance, a CPU or other hardware that is comprised upon the function expansion board or the function expansion unit performs the actual process, in whole or in part, after the program is written to the function expansion board or the function expansion unit, in accordance with the instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-194794, filed Jul. 26, 2007, which is hereby incorporated by reference herein in its entirety.

What is claimed is:

1. An image processing method configured to be executed by an image processing apparatus which comprises a plurality of processing blocks, which are connected in series by a common bus in which data and commands are multiplexed, each of the plurality of processing blocks comprising a processor, the image processing method comprising the steps of:

splitting multiplexed input, inputted into one of the processing blocks through the common bus, into commands and data;

performing image processing on a piece of data in an order corresponding to an inputted order in the one of the processing blocks and outputting the processed piece of data which is a result of the image processing to the common bus;

executing a process indicated by a command, which is inputted into the one of the processing blocks after the piece of data is inputted and before the processed piece of data is outputted, upon the processor of the one of the processing blocks; and transferring the command to the common bus to be inputted into a next one of the processing blocks after outputting the processed piece of data.

2. The image processing method according to claim 1, wherein said executing step includes executing the process indicated by the command upon the processor when the processor has completed the image processing on the piece of data that is inputted into the one of the processing blocks prior to the command.

3. The image processing method according to claim 1, wherein said executing step includes setting a parameter indicated by the command upon the processor when the processor has completed the image processing on the piece of data that is inputted into the one of the processing blocks prior to the command.

4. The image processing method according to claim 1, wherein said executing step includes reading out a piece of data that denotes a status of the processor when the processor has completed the image processing on the piece of data that is inputted into the one of the processing blocks prior to the command.

5. The image processing method according to claim 1, wherein said executing step includes reading out a piece of data that denotes the status of the processor of the one of the processing blocks, and said transferring step includes delaying an output of the piece of data, which is read out, until the output of the image processing on the piece of data that is inputted into the one of the processing blocks prior to the command is finished.

6. The image processing method according to claim 1, wherein said transferring step further comprises a step of storing in a buffer a result of executing the process indicated by the command, and an identification that denotes whether the input into the one of the processing blocks is a piece of data or a command.

7. An image processing apparatus that comprises a plurality of processing blocks, which are connected in series by a common data bus in which data and commands are multiplexed, wherein each of said plurality of processing blocks comprises:

a splitting unit which splits multiplexed input, inputted into the processing block through the common bus, into commands and data;

a processor comprising:

a first processing unit which performs image processing on a piece of data in an order corresponding to an inputted order in said processing block and outputs the processed piece of data which is a result of the image processing to the common bus; and a second processing unit which executes a process indicated by a command, which is inputted into said processing block after the piece of data is inputted and before the processed piece of data is outputted, upon said processor; and a transfer unit which transfers the command to the common bus to be inputted into a next one of the processing blocks after outputting the processed piece of data.

8. The image processing apparatus according to claim 7, wherein said second processing unit executes the process indicated by the command upon said processor when said first processing unit has completed the image processing on the piece of data that is inputted into said processing block prior to the command.

9. The image processing apparatus according to claim 7, wherein said second processing unit sets a parameter indicated by the command upon said processor when said first processing unit has completed the image processing on the piece of data that is inputted into said processing block prior to the command.

10. The image processing apparatus according to claim 7, wherein said second processing unit reads out a piece of data that denotes a status of said processor when said first processing unit has completed the image processing on the piece of data that is inputted into said processing block prior to the command.

11. The image processing apparatus according to claim 7, wherein said second processing unit reads out the piece of data that denotes the status of said processor, and said transfer unit delays an output of the piece of data, which is read out, until the output of said first processing unit that corresponds to the piece of data that is inputted into said processing block prior to the command is finished.

12. The image processing apparatus according to claim 7, wherein said transfer unit further comprises a buffer configured to store a result of executing the process indicated by the command, and an identification that denotes whether the input of the processing block is a piece data or a command.

* * * * *